US009013746B2

(12) United States Patent
Saitoh et al.

(10) Patent No.: US 9,013,746 B2
(45) Date of Patent: Apr. 21, 2015

(54) IMAGE FORMING APPARATUS, PRINT PROCESSING SYSTEM, PRINT PROCESSING METHOD, AND COMPUTER-READABLE RECORDING MEDIUM STORING PROGRAM

(75) Inventors: Takashi Saitoh, Tokyo (JP); Yutaka Tamada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 495 days.

(21) Appl. No.: 13/053,429

(22) Filed: Mar. 22, 2011

(65) Prior Publication Data

US 2011/0235114 A1    Sep. 29, 2011

Related U.S. Application Data

(60) Provisional application No. 61/317,724, filed on Mar. 26, 2010, provisional application No. 61/331,122, filed on May 4, 2010.

(51) Int. Cl.
*G06F 3/12* (2006.01)
*H04N 1/00* (2006.01)
*G06F 3/048* (2013.01)

(52) U.S. Cl.
CPC ........ *H04N 1/00413* (2013.01); *H04N 1/00222* (2013.01); *H04N 1/00233* (2013.01);
(Continued)

(58) Field of Classification Search
CPC . G06F 3/0481; G06F 3/04817; G06F 3/1259; G06F 3/048; H04N 1/00233; H04N 1/00413; H04N 1/00472; H04N 1/00222
USPC ......... 358/1.1, 1.11–1.18, 400–404; 399/8–30, 80–83; 715/700, 763, 810, 715/835, 846, 967, 976, 977; 718/1, 718/100–108
See application file for complete search history.

(56) References Cited

U.S. PATENT DOCUMENTS 5,669,040 A * 9/1997 Hisatake ......................... 399/83
6,421,509 B1 7/2002 Nomura et al.
(Continued)

FOREIGN PATENT DOCUMENTS

JP    2001-154773    6/2001
JP    2005-102249    4/2005
(Continued)

OTHER PUBLICATIONS

Office Action of Notification of Reason(s) for Refusal for Japanese Patent Application No. 2011-068281 dated Dec. 24, 2013, 2 pgs.

*Primary Examiner* — Chad Dickerson
(74) *Attorney, Agent, or Firm* — Amin, Turocy & Watson, LLP

(57) ABSTRACT

There is provided an image forming apparatus capable of displaying a screen so that the contents of print jobs can be grasped immediately.
The image forming apparatus includes an information acquisition section that acquires job information at least including information for identifying target print jobs to be displayed in a list and setting information for designating settings of print processes included in the target print jobs in order to display a list of print jobs output from terminals connected to the image forming apparatus so as be able to perform data communication on a screen; a display controller that displays a list of print jobs on the screen based on the job information acquired by the information acquisition section, in which the settings of the print processes designated by the setting information are displayed on a list screen as graphics representing the content of the setting for each setting item; and a print controller that controls execution of print jobs selected by an operation input from among the print jobs displayed in the list.

8 Claims, 16 Drawing Sheets

(52) U.S. Cl.
CPC .... *H04N1/00472* (2013.01); *H04N 2201/0094* (2013.01); *H04N 2201/3215* (2013.01); *H04N 2201/3216* (2013.01); *H04N 2201/3221* (2013.01); *H04N 2201/3226* (2013.01); *H04N 2201/3242* (2013.01); *H04N 2201/3273* (2013.01); *G06F 3/1207* (2013.01); *G06F 3/1259* (2013.01); *G06F 3/1261* (2013.01); *G06F 3/1285* (2013.01)

(56) References Cited

U.S. PATENT DOCUMENTS

| | | | |
|---|---|---|---|
| 6,917,437 B1 * | 7/2005 | Myers et al. | 358/1.15 |
| 8,243,087 B2 | 8/2012 | Sugimoto et al. | |
| 8,325,354 B2 | 12/2012 | Yoshida et al. | |
| 8,467,080 B2 | 6/2013 | Kamijo | |
| 2001/0029521 A1 * | 10/2001 | Matsuda et al. | 709/201 |
| 2001/0052995 A1 * | 12/2001 | Idehara | 358/1.15 |
| 2005/0141007 A1 * | 6/2005 | Shirai et al. | 358/1.13 |
| 2008/0038032 A1 | 2/2008 | Suzue | |
| 2008/0263199 A1 * | 10/2008 | Maki et al. | 709/224 |
| 2009/0174894 A1 | 7/2009 | Kamijo | |
| 2009/0296131 A1 | 12/2009 | Yoshida et al. | |
| 2009/0315904 A1 | 12/2009 | Sugimoto et al. | |

FOREIGN PATENT DOCUMENTS

| | | |
|---|---|---|
| JP | 2008-227771 | 9/2008 |
| JP | 2010-004301 | 1/2010 |
| JP | 2010-056904 | 3/2010 |

* cited by examiner

FIG.3

| No. | FILE NAME | TIME | SHEET | PAGES | COPIES | PRINT SETTING | | |
|---|---|---|---|---|---|---|---|---|
| | | | | | | COLOR | BOTH OR ONE-SIDE | N in 1 |
| 1 | AAA.xls | 22, 12:34 | A4 | 1 | 12 | MONOCHROME | BOTH SIDES | 1 |
| 2 | BBB.ppt | 22, 12:35 | A4-R | 2 | 2 | COLOR | ONE SIDE | 2 |
| 3 | CCC.doc | 22, 12:40 | A3 | 3 | 1 | MONOCHROME | BOTH SIDES | 1 |
| 4 | DDD.doc | 22, 12:48 | A4 | 3 | 10 | COLOR | ONE SIDE | 4 |
| 5 | EEE.xls | 22, 12:56 | A4 | 5 | 40 | COLOR | BOTH SIDES | 2 |
| ... | ... | ... | ... | ... | ... | ... | ... | ... |

FIG.4

PLEASE SELECT A PRINT JOB.

USER : abc

| No. | FILE NAME | TIME | SHEET | PAGES | COPIES | PRINT SETTING |
|---|---|---|---|---|---|---|
| | | | | | | 43a  43b  43c |
| 1 | AAA.xls | 22, 12:34 | A4 | 1 | 12 | ■  ≡  1 |
| 2 | BBB.ppt | 22, 12:35 | A4-R | 2 | 2 | □  ≡  2 |
| 3 | CCC.doc | 22, 12:40 | A3 | 3 | 1 | ■  ≡  1 |
| 4 | DDD.doc | 22, 12:48 | A4 | 3 | 10 | ▨  ≡  4 |
| 5 | EEE.xls | 22, 12:56 | A4 | 5 | 40 | ▨  ≡  2 |

DELETE   DESELECT   SELECT ALL                PRINT

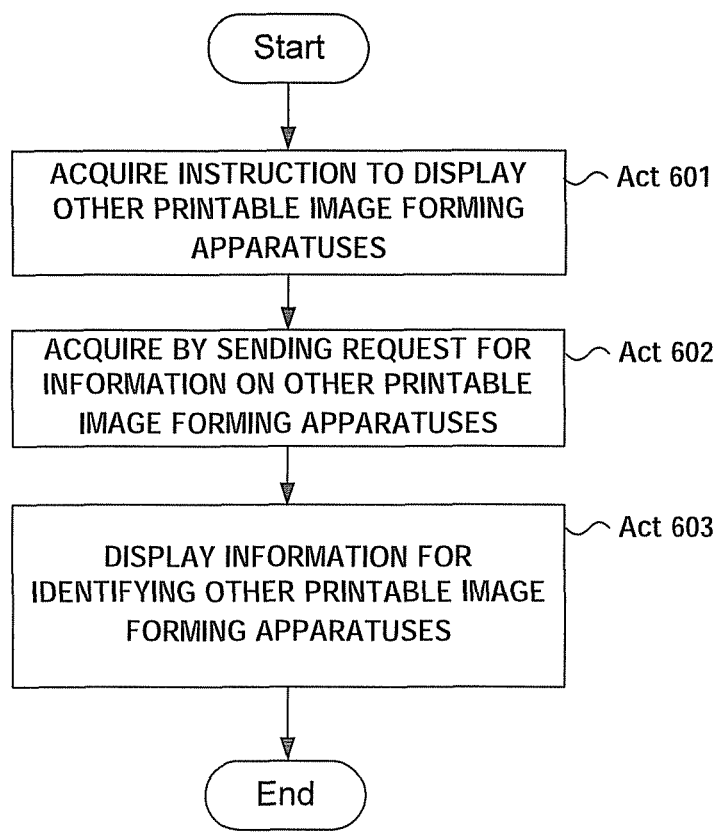

ND COMPUTER-READABLE
IMAGE FORMING APPARATUS, PRINT PROCESSING SYSTEM, PRINT PROCESSING METHOD, AND COMPUTER-READABLE RECORDING MEDIUM STORING PROGRAM

CROSS-REFERENCE TO RELATED APPLICATIONS

This application is based upon and claims the benefit of priority from U.S. provisional application 61/317,724, filed on Mar. 26, 2010; and U.S. provisional application 61/331,122, filed on May 4, 2010; the entire contents all of which are incorporated herein by reference.

FIELD

The Embodiments described herein relate generally to a method of displaying print jobs processed in an image forming apparatus.

BACKGROUND

Conventionally, client computers send print jobs to an image forming apparatus such as an MFP (Multi Functional Peripheral) and a print server through a network, and the image forming apparatus performs print processing based on the print jobs. A list of print jobs is displayed on a display panel of the image forming apparatus or a display of a client computer which has accessed the print server.

By displaying the print jobs in a list, users can select a print job that they want to execute preferentially from among a plurality of print jobs and instruct so that the selected print job is printed first of all. Moreover, when the user of a client computer has sent a print job with errors in print settings, the user can select and delete the print job from the list.

However, when a number of jobs are included in the print job list, the user may find it difficult to locate a job that is subject to deletion or the like from the list.

DESCRIPTION OF THE DRAWINGS

FIG. 3 is a diagram showing an example of a data arrangement of a job registration database.

FIG. 4 is a diagram showing a print job list screen.

FIG. 16 is a flowchart illustrating the flow of a process of displaying a screen that guides users to other image forming apparatuses capable of executing printing.

DETAILED DESCRIPTION

According to the embodiments of the present invention, an image forming apparatus includes an information acquisition section, a display controller, and a print controller. The information acquisition section acquires job information at least including information for identifying target print jobs to be displayed in a list and setting information for designating settings of print processes included in the target print jobs in order to display a list of print jobs output from terminals connected to the image forming apparatus so as be able to perform data communication on a screen. The display controller displays the list of print jobs on the screen based on the job information acquired by the information acquisition section, in which the settings of the print processes designated by the setting information are displayed on a list screen as graphics representing the content of the setting for each setting item. The print controller controls execution of the print jobs selected by an operation input from among the print jobs displayed in the list.

Hereinafter, embodiments will be described with reference to the drawings.

First Embodiment

Figure 1:
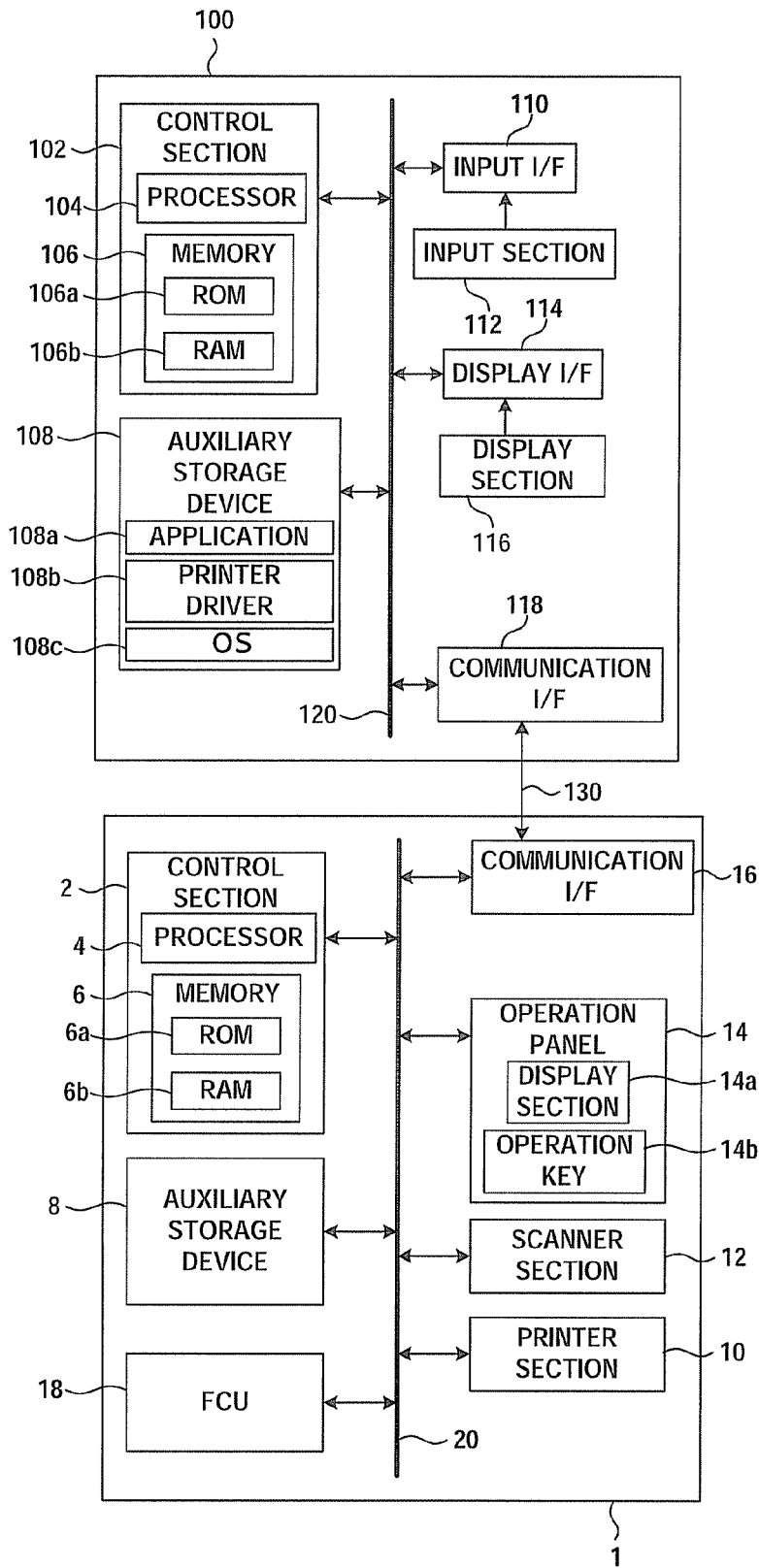
FIG. 1 is a block diagram illustrating a configuration of a system including an image forming apparatus and a client terminal.

FIG. 1 is a block diagram illustrating a configuration of a system including an image forming apparatus 1 and a client terminal 100.

First, the image forming apparatus 1 includes a control section 2, an auxiliary storage device 8, a printer section 10, a scanner section 12, an operation panel 14, a communication interface (communication I/F) 16, and a facsimile control unit (FCU) 18. The respective components of the image forming apparatus 1 are connected through a bus 20.

The control section 2 includes a processor 4, a memory 6, and an operating system (OS).

The processor 4 is a CPU (Central Processing Unit) or an MPU (Micro Processing Unit).

The memory 6 is a semiconductor memory, for example. The memory 6 includes a ROM (Read Only Memory) 6a that stores a control program of the processor 4 and a RAM (Random Access Memory) 6b that provides a temporary work area to the processor 4.

The control section 2 controls the printer section 10, the scanner section 12, the operation panel 14, the communication I/F 16, the FCU 18, and the like based on a control program and the like stored in the ROM 6a or the auxiliary storage device 8. The control section 2 may further have various printing functions. The control section 2 may include an ASIC (Application Specific Integrated Circuit) that realizes a part or the entirety of the functions of the image forming apparatus 1.

The auxiliary storage device 8 stores an application program and an OS. The application program includes a program that executes the functions of the image forming apparatus 1, for example, a copying function, a print function, a scanner function, a facsimile function, and a network file function. The application program further has a Web client application (Web browser) and other applications.

The auxiliary storage device 8 stores image data generated by the scanner section 12 reading a document, data acquired from an external device connected to the communication I/F 16 through a network 130, and other data. In addition, in the present embodiment, the auxiliary storage device 8 temporarily stores print jobs transmitted from the client terminal 100 connected through the network 130 until the print jobs are executed.

For example, the auxiliary storage device 8 may be a magnetic storage device such as a hard disk drive, an optical storage device, a semiconductor storage device (e.g., a flash memory), or an arbitrary combination of these storage devices. The auxiliary storage device 8 can appropriately store software updates, protected electronic documents, text data, account information, policy information, and the like.

The printer section 10 prints an image corresponding to image data of a document read by the scanner section 12 and an image corresponding to data transmitted from a computer including the external client terminal 100 through the network 130 on a sheet.

The scanner section 12 includes an internal scanning and reading unit that reads a document as an image, a document platen, and an automatic document feeder that transports a document to a reading position. The scanning and reading unit of the scanner section 12 reads a document which is set on the document platen or the automatic document feeder.

The operation panel 14 includes a touch panel-type display section 14*a* and a variety of operation keys 14*b*. The display section 14*a* displays instruction items concerning print conditions, for example, such as sheet size, number of copies, printing density setting, or finishing (binding and folding). The operation keys 14*b* include, for example, numeric keys, a reset key, a stop key, a start key, and the like. A user can input instructions relating to various processes and items displayed on the display section 14*a* through the display section 14*a* or using the operation keys 14*b*.

The communication I/F 16 is an interface that connects the image forming apparatus 1 and the client terminal 100 through the network 130. Moreover, although FIG. 1 shows a configuration in which the image forming apparatus 1 and the client terminal 100 are connected, the communication I/F 16 can connect to other external devices through the network 130. The communication I/F 16 connects to the external devices through the network 130 by appropriate wireless or wired communication, for example, Bluetooth (registered trademark), infrared connection, or optical connection, specifically compliant with communication standards such as IEEE 802.15, IEEE 802.11, IEEE 802.3, or IEEE 1284. The communication I/F 16 includes a buffer and temporarily stores a part or the entirety of the data received through the network 130 in the buffer.

The control section 2 communicates with a PC (Personal Computer) including the client terminal 100 or the like connected through the communication I/F 16 to the network 130 and other external devices.

The facsimile control unit (FCU) 20 controls transmission and reception of facsimiles in the image forming apparatus 1.

The client terminal 100 includes a control section 102, an auxiliary storage device 108, an input interface (input I/F) 110, an input section 112, a display interface (display I/F) 114, a display section 116, and a communication interface (communication I/F) 118. The respective components of the client terminal 100 are connected through a bus 120. A PC (Personal Computer) may be used as the client terminal 100.

The control section 102 includes a processor 104 which is a CPU (Central Processing Unit) or an MPU (Micro Processing Unit), a memory 106, and an operating system (OS) 108*c*.

The processor 104 executes an application 108*a* stored in the auxiliary storage device 108 and further executes a printer driver 108*b*, thus generating print jobs based on print target data. The processor 104 transmits the generated print jobs to the image forming apparatus 1 through the communication I/F 118 and the network 130.

The memory 106 is a semiconductor memory, for example, and includes a ROM (Read Only Memory) 106*a* that stores a control program of the processor 104 and a RAM (Random Access Memory) 106*b* that provides a temporary work area to the processor 104.

The auxiliary storage device 108 stores the application program 108*a*, the printer driver 108*b*, and the OS 108*c* which is a control program of the processor 104.

The application program 108*a* operates as software of the OS 108*c*. The application program 108*a* includes a Web application in addition to typical software such as a document creating software.

The printer driver 108*b* is a device driver that controls the image forming apparatus 1 in accordance with a print instruction from the application program 108*a* and operates as software of the OS 108*c*.

For example, the auxiliary storage device 108 having the above-described functions may be a magnetic storage device such as a hard disk drive, an optical storage device, a semiconductor storage device such as a flash memory, or an arbitrary combination of these storage devices.

The input I/F 110 is an interface that connects the input section 112. The input section 112 is a pointing device such as a keyboard and a mouse.

The display I/F 114 is an interface that connects the display section 116. The display I/F 114 receives data to be displayed on the display section 116 from other computers connected to the bus 120. The display I/F 114 outputs display data to the display section 116. The display section 116 displays the output display data. The display section 116 is a display connected to a PC, for example.

The communication I/F 118 is an interface that connects to external devices. The communication I/F 118 communicates with external devices (e.g., the image forming apparatus 1 and other PCs and USB devices) through the network 130 by appropriate wireless or wired communication, for example, Bluetooth (registered trademark), infrared connection, or optical connection, specifically compliant with communication standards such as IEEE 802.15, IEEE 802.11, IEEE 802.3, or IEEE 1284. The control section 102 communicates with the image forming apparatus 1 and other external devices such as other PCs and USB devices through the communication I/F 118. In the present embodiment, print jobs are transmitted to the image forming apparatus 1 through the communication I/F 118.

Figure 2:
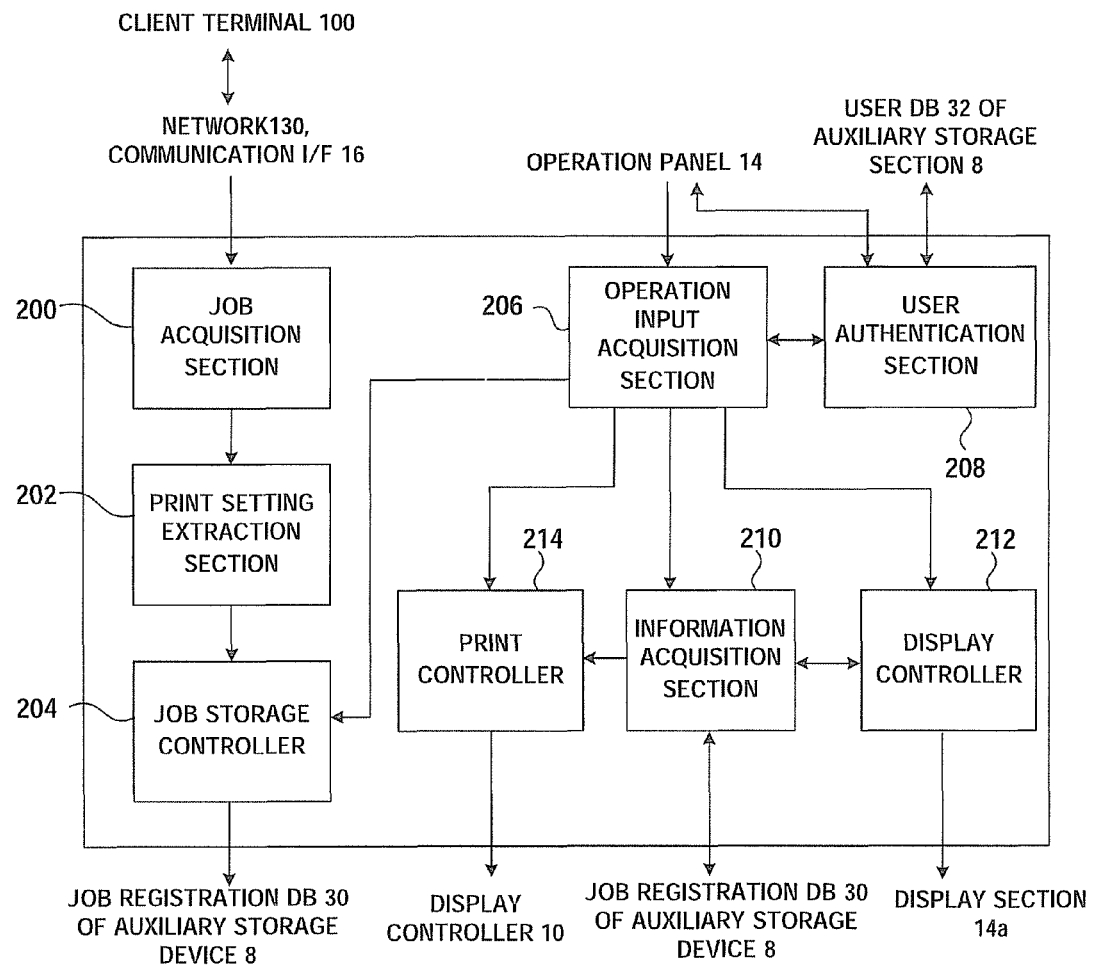
FIG. 2 is a functional block diagram of the image forming apparatus.

Next, the functional block of the image forming apparatus 1 will be described. FIG. 2 is a functional block diagram showing the functions for executing a process of acquiring print jobs output from the client terminal 100 and storing the same in a storage region, a process of displaying the store print jobs in a list, and various processes concerning the print jobs displayed in the list.

In the present embodiment, the list of print jobs in the image forming apparatus 1 is used, for example, for enabling a user to output a number of print jobs from the client terminal 100, move to the image forming apparatus 1, select a necessary print job from the list of print jobs displayed on the display section 14a, and execute printing for the selected print job. With such a process, the user can output a number of print jobs to the image forming apparatus 1 in advance regardless of their priorities and then start printing preferentially from a necessary job.

The image forming apparatus 1 includes a job acquisition section 200, a print setting extraction section 202, a job storage controller 204, an operation input acquisition section 206, a user authentication section 208, an information acquisition section 210, a display controller 212, and a print controller 214.

The job acquisition section 200 acquires print jobs which are generated by the printer driver 108b in the client terminal 100 and output to the image forming apparatus 1. The job acquisition section 200 acquires the print jobs through the network 130 and the communication I/F 16.

The print setting extraction section 202 extracts setting information of necessary print setting items from print settings included in the print jobs. The image forming apparatus 1 of the present embodiment displays the settings of predetermined print setting items as icons when displaying the list of print jobs on the display section 14. Therefore, the print setting extraction section 202 extracts at least the setting information of the print setting items which are determined in advance so as to be displayed as icons from the print jobs.

Specific examples of the print setting items displayed as icons include color or monochrome print setting, both or one side print setting, multiple page setting, stapler setting, punching setting, and the like. The multiple page setting is a setting for printing a plurality of pages in one sheet and is also referred to as N-in-1 print. The stapler setting is a setting for stitching printed and discharged documents with a stapler, and the punching setting is a setting for punching holes for stitching printed documents together. The print setting extraction section 202 extracts setting information of print setting items which are displayed as icons when displaying the list of print jobs, from among these print setting items.

The job storage controller 204 registers print jobs acquired by the job acquisition section 200 in a job registration database (job registration DB) 30 which is stored in the auxiliary storage device 8. Moreover, the job storage controller 204 registers the setting information of the print setting items extracted by the print setting extraction section 202 in the job registration DB 30 as information to be displayed as icons when displaying the list of print jobs so as to be correlated with the print jobs.

Here, the job registration DB 30 will be described. FIG. 3 shows an example of a data arrangement of the job registration DB 30. In the job registration DE 30, print job data are registered so as to be correlated with file names of respective print jobs, a time, a sheet size, number of pages, number of copies, and the setting information of the respective items of the print settings displayed as icons when displaying the list of print jobs.

In FIG. 3, color or monochrome print setting, both or one-side print setting, and multiple page setting are shown as the print setting items.

For example, a job listed by No. 1 is a print job of which the file name is AAA.xls, the sheet size is A4, the number of pages is 1 page, the number of copies is 12 copies, and in which monochrome printing, both-side printing, and multiple printing of one page in one sheet are registered as the setting contents of the print setting items to be displayed as icons.

The operation input acquisition section 206 acquires operation inputs from the operation panel 14. In the present embodiment, the operation input acquisition section 206 acquires an operation input of instructing to display the list of print jobs which the user has output to the image forming apparatus 1. Moreover, when the list of print jobs is displayed on the display section 14a of the operation panel 14, the operation input acquisition section 206 also acquires an operation input of instructing to execute various processes concerning the displayed print jobs. The various processes concerning the print jobs include a process of selecting a print job from the displayed list, a printing process with respect to the selected print job, a process of deleting print jobs, and the like.

When a plurality of users use the image forming apparatus 1, the list of print jobs may be displayed for each user. In this case, the user operates the operation panel 14 to perform a login process. The user authentication section 208 performs the login process.

Specifically, the login process is performed in such a way that a user ID and password are acquired through an operation input on the operation panel 14, a user DB 32 in which the user ID and password are stored in a correlated manner is accessed so as to make a determination as to whether or not the input user ID and password are appropriate. When the login is permitted, the user can perform processing on the image forming apparatus 1, which is permitted to a logged-in user. In the present embodiment, the list of print jobs output by the logged-in user is displayed on the display section 14a. The user DB 32 can be stored in the auxiliary storage device 8, for example.

When the operation input acquisition section 206 acquires the operation input of instructing to display the list of print jobs, the information acquisition section 210 accesses the job registration DB 30 in which the print jobs are registered and acquires job information including the setting information representing various settings of the registered print jobs. In the present embodiment, the job information is information at least including the print setting information included in the print jobs and information for identifying the print jobs. Specifically, the job information is information of the respective items shown in a print job list 42 shown in FIG. 4 described later. The information for identifying the print jobs is a file name of source data of a print job, for example.

The display controller 212 displays the list of print jobs on the display section 14a based on the job information acquired by the information acquisition section 210. Moreover, the display controller 212 displays the setting contents of the print setting items to be displayed as icons as corresponding icons on the list screen based on the setting information of the print setting items correlated with the print jobs.

Next, the list screen of print jobs will be described in detail with reference to FIG. 4. FIG. 4 shows a list screen 40 of print jobs which the display controller 212 displays on the display section 14a. On the list screen 40 of FIG. 4, a user name 41, the print job list 42, and various operation input buttons 45 to 48 are displayed.

The user name 41 shows a user name who is logged in through the login process by the user authentication section 208. In FIG. 4, a user whose user name is "abc" is logged in.

In the print job list 42, the list of print jobs which the user "abc" has output to the image forming apparatus 1 and which are registered in the job registration DB 30 is displayed. FIG. 4 shows five jobs. In a print setting field 43 of the print job list 42, an icon 43a representing the setting content of color or monochrome print setting, an icon 43b representing the setting content of both or one-side print setting, and an icon 43c representing the setting content of multiple print setting are displayed. For example, as for a job listed by No. 1, print settings including monochrome (corresponding to the icon 43a), double sides (corresponding to the icon 43b), and one page in one sheet (corresponding to the icon 43c) are displayed as icons. Moreover, as for a job listed by No. 2, print settings including color print, one-side printing, and two pages in one sheet (2-in-1 printing) are displayed.

Under the print job list 42, a delete button 45, a deselect button 46, a select-all button 47, and a print button 48 are displayed. The delete button 45 is pressed when a user touches the operation panel 14 to select print jobs from the list and deletes the selected print jobs. The deselect button 46 is pressed when the user wants to deselect the print jobs selected in such a way. The select-all button 47 is pressed when the user wants to select all the print jobs displayed in the print job list 42. The print button 48 is pressed when the user instructs execution of printing of the selected print jobs.

The image information of the icons displayed in accordance with the setting contents of the print setting items may be stored in the auxiliary storage device 8 so as to be correlated with the setting information, for example. The display controller 212 can display the icons in accordance with the setting contents by acquiring the image information of the icons corresponding to the setting information of the setting items being displayed from the auxiliary storage device 8.

When acquiring an instruction to execute printing of a print job, the print controller 214 causes the printer section 10 to perform printing. In the present embodiment, when a user selects a job to be printed from the print job list 42 shown in FIG. 4 displayed on the display panel 14 and presses the print button 48, the print controller 214 acquires data of the corresponding print job from the job registration DB 30. Then, the print controller 214 causes the printer section 10 to execute printing based on the acquired print job data.

Hereinabove, the functional block of the image forming apparatus 1 according to the present embodiment has been described.

Figure 5:
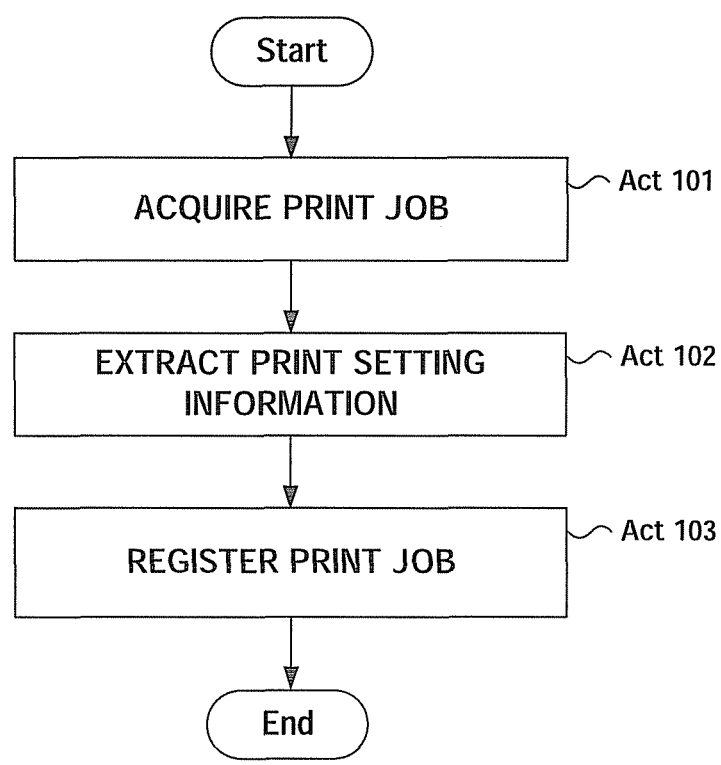
FIG. 5 is a flowchart illustrating the flow of a process of registering print jobs acquired by the image forming apparatus in the job registration database.

Next, the flow of a process in which the image forming apparatus 1 of the present embodiment acquires print jobs from the client terminal 100 and registers the print jobs in the job registration DB 30 will be described. FIG. 5 is a flowchart illustrating the flow of a process of registering the print jobs acquired by the image forming apparatus 1 in the job registration DE 30.

First, the job acquisition section 200 acquires print jobs transmitted from the client terminal 100 through the communication I/F 16 connected to the network 130 (Act 101).

Subsequently, the print setting extraction section 202 analyzes the print jobs acquired by the job acquisition section 200 and extracts setting information of print setting items to be displayed as icons when displaying the list of print jobs (Act 102). In the present embodiment, the respective kinds of setting information on color or monochrome print setting, both or one-side print setting, and multiple print setting are extracted as examples of the print setting items to be displayed as icons.

Subsequently, the job storage controller 204 registers the acquired print jobs in the job registration DE 30 (Act 103). Moreover, the job storage controller 204 registers the setting information of the print setting items extracted by the print setting extraction section 202 in the job registration DE 30 so as to be correlated with the print jobs.

Figure 6:
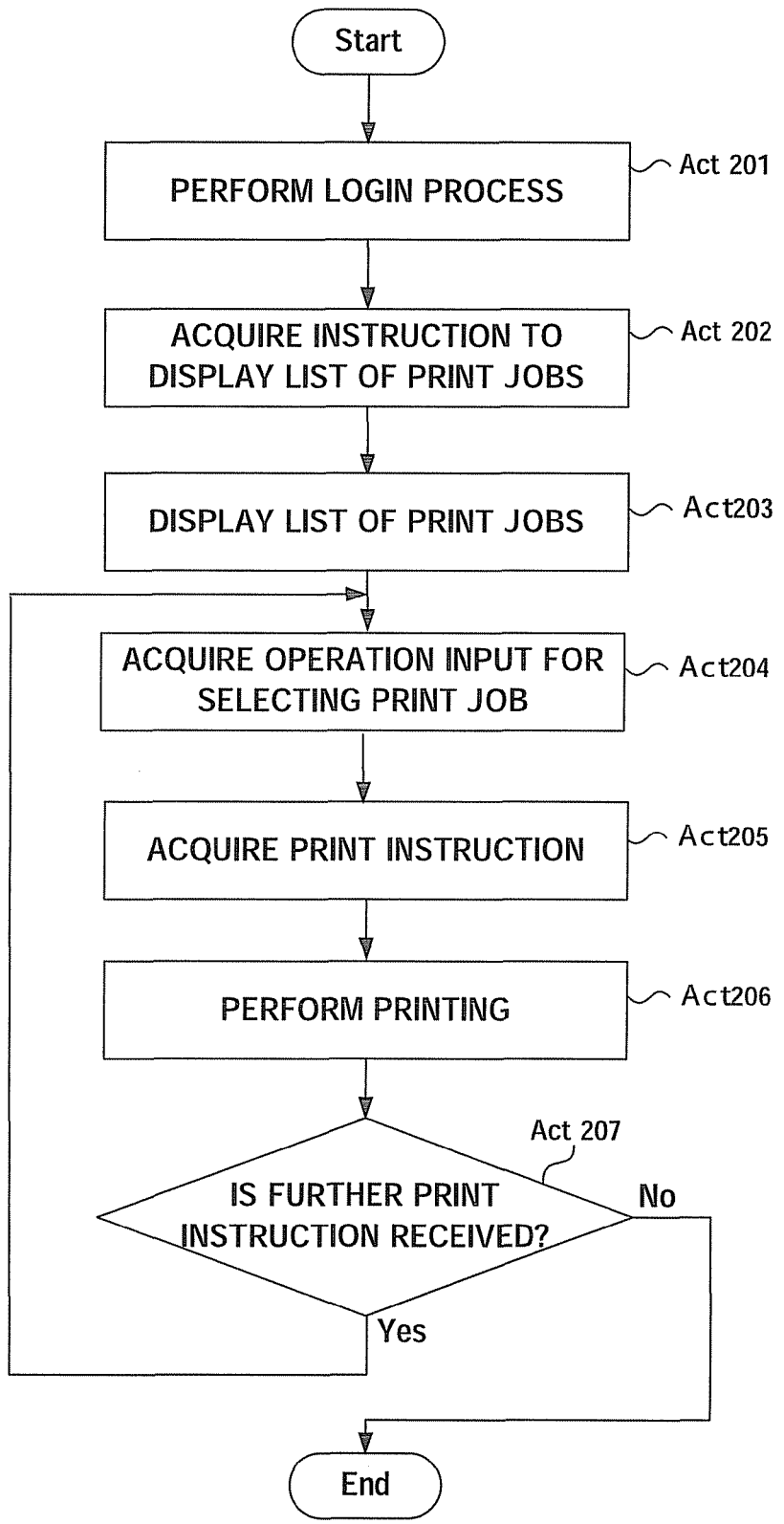
FIG. 6 is a flowchart illustrating the flow of a process of displaying a list of print jobs and various processes with respect to the jobs performed by the image forming apparatus.

Next, the flow of processes performed by the image forming apparatus 1 of the present embodiment, specifically a process of displaying the list screen 40 on the display section 14a and various processes executed based on the operation input performed on the displayed list screen will be described. FIG. 6 is a flowchart illustrating the flow of a process of displaying a list of print jobs and various processes with respect to a job, performed by the image forming apparatus 1 of the present embodiment.

First, the user authentication section 208 performs a login process (Act 201). Specifically, when a plurality of users use the image forming apparatus 1, the user performs a login process in order to display the list of print jobs output by the user. The login process is performed in such a way that the user operates the operation panel 14 to input the user ID and password. When the login process is not necessary such as in a case where only one user uses the image forming apparatus 1, the login process of Act 201 may be omitted.

Subsequently, when the user operates the operation panel 14 in order to display the list of print jobs which the user has output to the image forming apparatus 1, the operation input acquisition section 206 acquires an operation input of instructing to display the list of print jobs (Act 202).

Subsequently, the display controller 212 displays the print job list of the logged-in user (Act 203). Specifically, first, the information acquisition section 210 accesses the job registration DB 30 to acquire job information at least including a file name which is information for identifying a print job and print setting information correlated with the print job from the job registration DB 30 with respect to the print jobs registered by the user ID logged in through the login process. Moreover, the display controller 212 displays the list of print jobs on the display section 14a based on the acquired job information. At that time, in the present embodiment, the display controller 212 displays the setting information of the print setting items as corresponding icons. The setting information of the print setting items is the information which the print setting extraction section 202 extracts from the print jobs when the image forming apparatus 1 acquires the print jobs. In the present embodiment, as shown in FIG. 4, the respective setting contents of color or monochrome display setting, both or one-side print setting, and multiple print setting are displayed as icons.

Subsequently, the user selects print jobs to be printed from the displayed print job list, for example, by operating the operation panel 14 (Act 204). In addition, when the user inputs an instruction to execute the selected print jobs, the operation input acquisition section 206 acquires the instruction to execute printing with respect to the selected print jobs (Act 205).

Subsequently, printing is executed for the selected print jobs (Act 206). Specifically, first, the information acquisition section 210 acquires data of print jobs to be executed from the job registration DB 30. Moreover, the print controller 214 causes the printer section 10 to execute printing based on the print jobs acquired by the information acquisition section 210.

When the operation input acquisition section 206 further acquires an operation input of instructing execution of processing concerning print jobs (Act 207: Yes), the flow returns to Act 204. On the other hand, when an operation input to terminate a process such as printing is acquired (Act 207: No), the process of displaying the print job list ends.

Although FIG. 6 illustrates the flow of a process of displaying a print job list and executing printing of selected print jobs, a process of deleting selected print jobs may be executed besides the printing. In this case, after the operation input acquisition section 206 acquires an operation input of selecting print jobs in Act 204, when the user presses the delete button 45 in the screen shown in FIG. 4, an operation input of instructing a deleting process is acquired. In this case, the job storage controller 204 deletes print jobs selected as objects to be deleted from the job registration DE 30.

Besides this, when the deselect button 46 for inverting a selected state and the select-all button 47 for selecting all the print jobs are pressed, the display controller 212 and the like execute the processes corresponding to the instructions.

Hereinabove, the flow of the processes executed by the image forming apparatus 1 of the present embodiment, specifically the process of registering print jobs in the job registration DB 30, the process of displaying the list of registered print jobs on the display section 14a, and the processes performed in accordance with the operation inputs on the displayed list has been described.

According to the image forming apparatus 1 of the present embodiment, since the print setting contents of the print jobs registered in the image forming apparatus 1 are displayed as icons, it is possible to easily identify a target print job from the plurality of print jobs. Therefore, it is possible to quickly select a necessary print job from the plurality of print jobs and execute a process such as printing.

In particular, when the client terminal 100 changes the print setting of the same file so that a plurality of print jobs are output for the same file, a plurality of print jobs with the same file name, are registered in the image forming apparatus 1. In that case, it is difficult to identify the print jobs with a file name, a sheet size, and the like. However, by displaying the setting contents of the print setting items as icons as in the present embodiment, it is possible to easily identify the difference between the settings of the respective jobs and to select and print only a print job having the setting that the user wants to print.

On the other hand, when the print settings are not displayed as icons, and the job registration time, the number of pages, and the like are the same, a target print job is not distinctive from the other print jobs. Therefore, it is difficult to print only a print job having the setting content that the user wants to print.

In the present embodiment, the print setting extraction section 202 extracts the setting information of the print setting items to be displayed as icons from the acquired print jobs, the information acquisition section 210 acquires job information including the setting information extracted when displaying the list of print jobs, and the display controller 212 displays icons based on the acquired information. However, the present invention is not limited to this. The setting information of the print setting items to be displayed as icons may not be extracted at the time of acquiring the jobs, but the setting information of the print setting items to be displayed as icons may be extracted from the registered print jobs and displayed at the time of displaying the list of print jobs.

Moreover, in the present embodiment, the list of print jobs is displayed on the display section 14a of the image forming apparatus 1, and a process is performed in accordance with an operation input on the operation panel 14. However, the present invention is not limited to this. For example, the client terminal 100 may acquire by sending a request for job information necessary for displaying the list of print jobs to the image forming apparatus 1, and the acquired job information may be displayed on the display section 116 of the client terminal 100. Then, a process of executing printing of selected print jobs or a process of deleting the selected print jobs may be executed based on an operation input from the client terminal 100.

Second Embodiment

Next, a second embodiment will be described. In the present embodiment, a job registration DB 30 is stored in an external print server which is connected to a client terminal 100 and an image forming apparatus through a network. In the description of the present embodiment, the same components as the first embodiment will be denoted by the same reference numerals, and redundant description thereof will be omitted.

Figure 7:
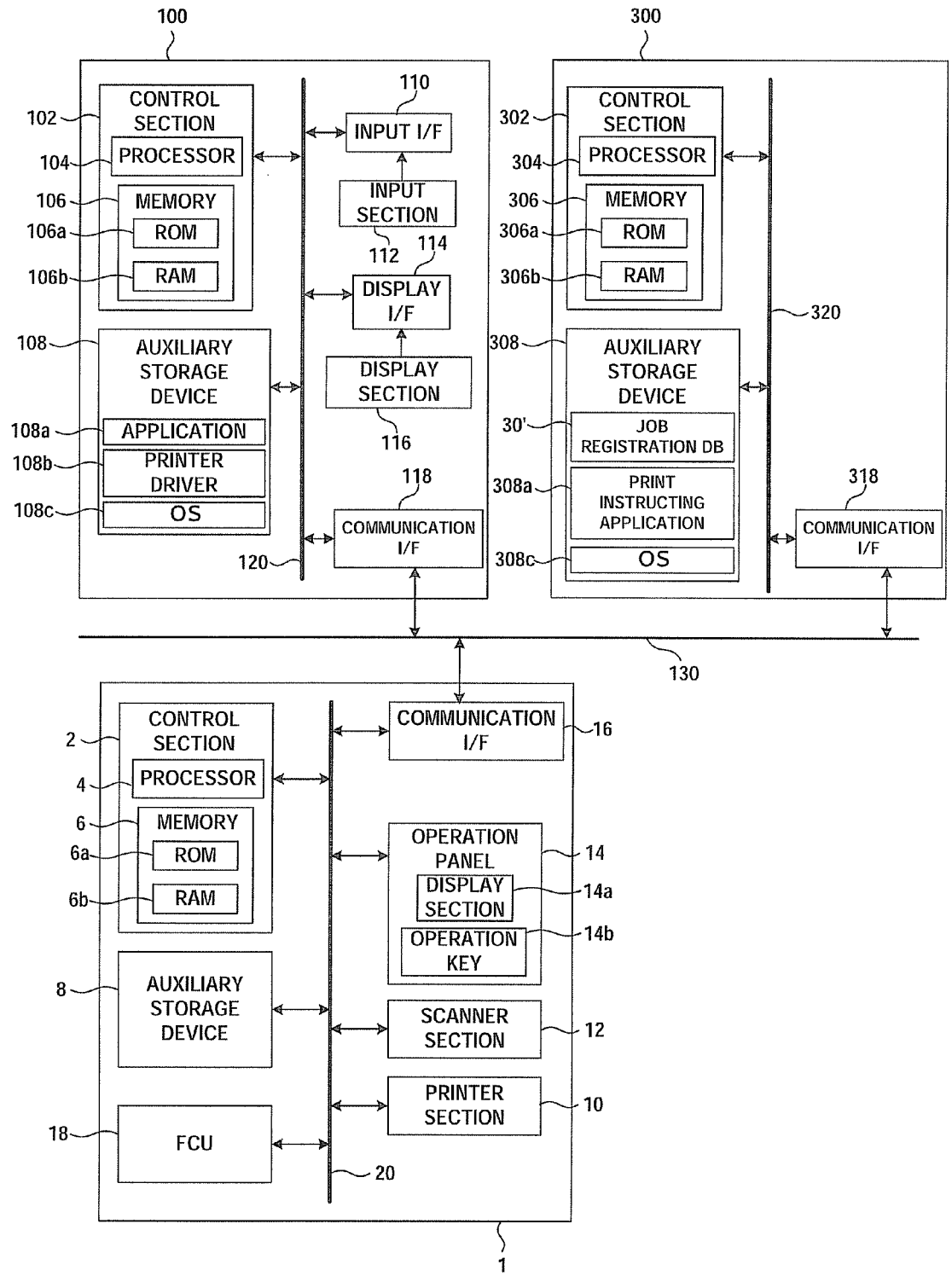
FIG. 7 is a diagram showing a configuration of a system including the client terminal, the image forming apparatus, and a print server.

FIG. 7 is a diagram showing a configuration of a system including the client terminal 100, an image forming apparatus 1, and a print server 300 according to the present embodiment.

The client terminal 100 has the same configuration as the first embodiment.

The image forming apparatus 1 has the same configuration as the first embodiment except that it does not have a job registration DB.

As the print server 300, basically, a PC (Personal Computer) having the same configuration as the client terminal 100 may be used.

Specifically, the print server 300 includes a control section 302 having a processor 304 and a memory 306, an auxiliary storage device 308, and a communication I/F 318. The print server 300 may include an input i/F, an input section, a display I/F, a display section, and the like similarly to the client terminal 100. These respective configurations of the print server 300 are the same as those of the client terminal 100, and description thereof will be omitted.

The auxiliary storage device 308 of the print server 300 stores a job registration DB 30' which was provided in the image forming apparatus 1 in the first embodiment. The job registration DB 30' registers print jobs output from terminals, including the client terminal 100, connected to a network.

The auxiliary storage device 308 stores a print instructing application 308a that issues a print instruction to image forming apparatuses connected to the print server 300, such as the image forming apparatus 1, and that manages printing in the image forming apparatus. The function of the print server 300, which is realized when the print instructing application 308a is started will be described later.

Figure 8:
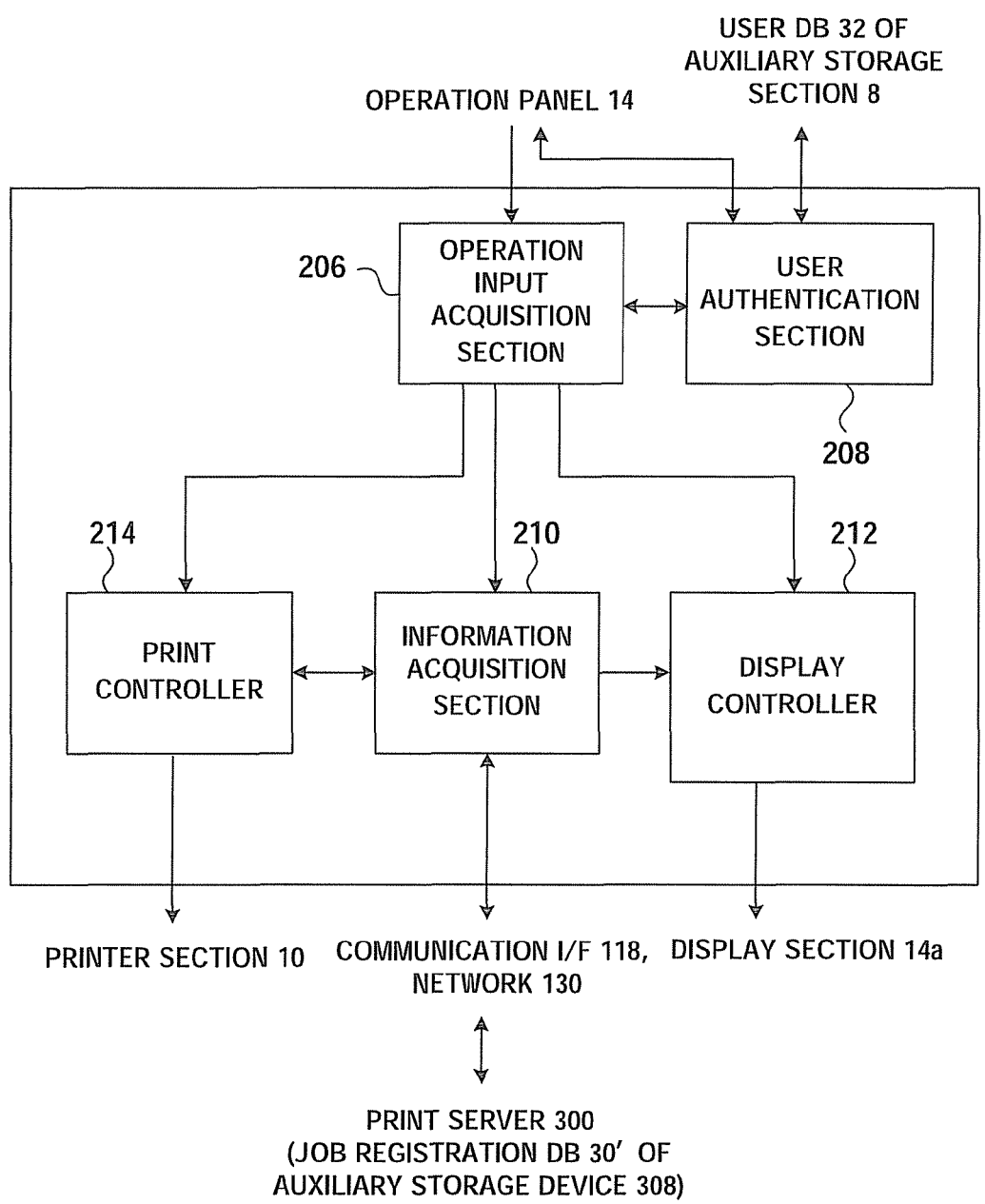
FIG. 8 is a functional block diagram showing the functions of the image forming apparatus.

Next, the function of the image forming apparatus 1 will be described. FIG. 8 is a functional block diagram showing the function of the image forming apparatus 1 according to the present embodiment.

The image forming apparatus 1 includes an operation input acquisition section 206, a user authentication section 208, an information acquisition section 210, a display controller 212, and a print controller 214. In the present embodiment, the function related to the process of acquiring print jobs from the client terminal 100 and the process of extracting the setting information of the print setting items is provided to the print server 300.

The functions of the operation input acquisition section 206 and the user authentication section 208 are the same as those of the first embodiment.

The information acquisition section 210 acquires job information for displaying the list of print jobs from the job registration DB 30' of the print server 300 in accordance with an operation on an operation panel 14. When print jobs are selected from the displayed print job list, and an operation input for a print instruction is received, the information acquisition section 210 acquires data of the selected print jobs from the job registration DB 30' of the print server 300 through a network 130.

The display controller 212 displays the list of print jobs and the like on a display section 14a based on the job information acquired by the information acquisition section 210 similarly to the first embodiment.

When a print instruction is acquired, the print controller 214 causes a printer section 10 to execute printing based on the print job data acquired by the information acquisition section 210 similarly to the first embodiment.

Figure 9:
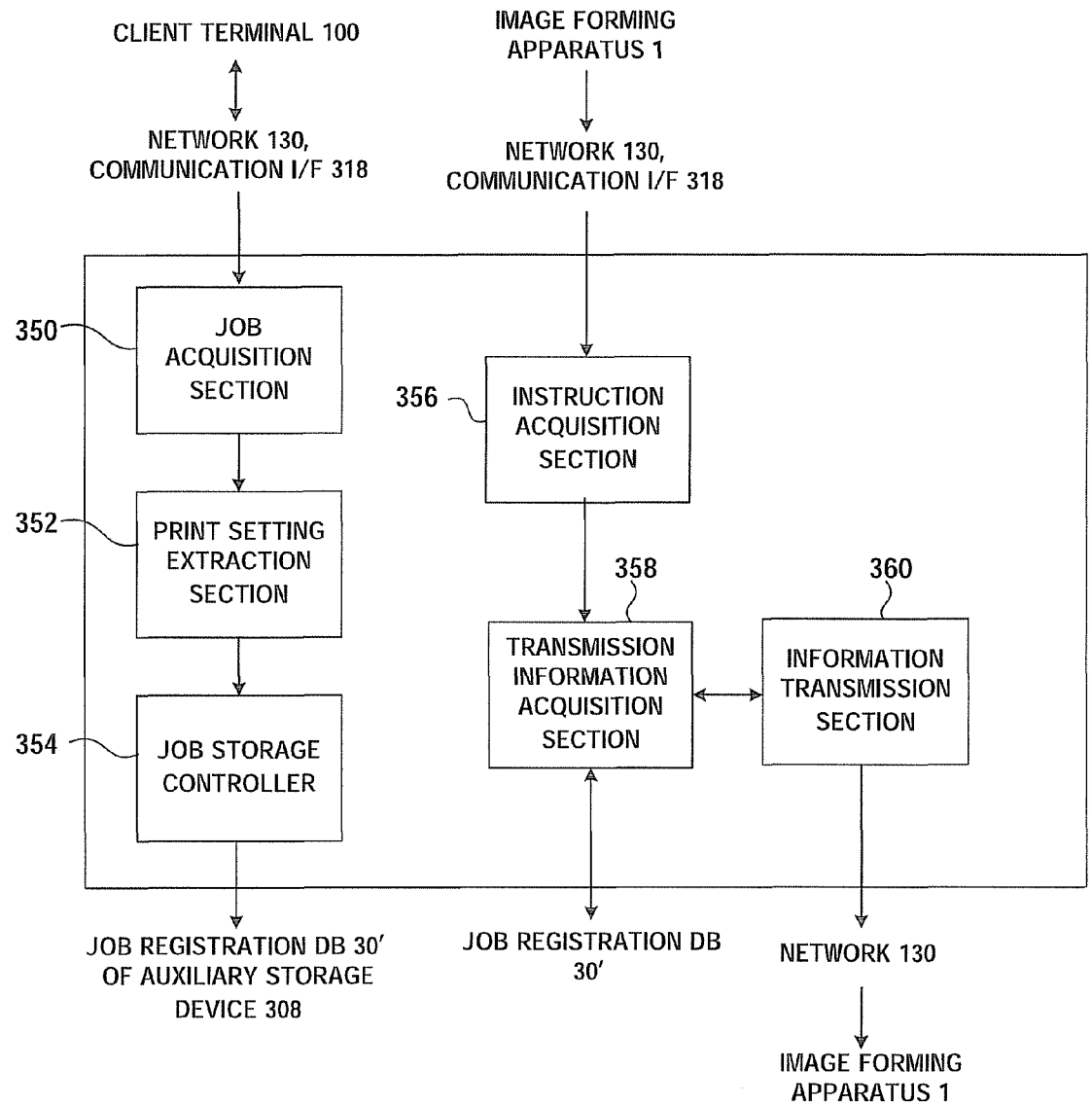
FIG. 9 is a functional block diagram showing the functions of the print server.

Next, the function of the print server 300 will be described. FIG. 9 is a functional block diagram showing the function of the print server 300 of the present embodiment.

The print server 300 includes a job acquisition section 350, a print setting extraction section 352, a job storage controller 354, an instruction acquisition section 356, a transmission information acquisition section 358, an information transmission section 360. These functions are realized when the processor 304 executes the print instructing application 308a.

The job acquisition section 350, the print setting extraction section 352, and the job storage controller 354 are the same as the functions of the image forming apparatus 1 according to the first embodiment. The job acquisition section 350 acquires print jobs output from the client terminal 100. The print setting extraction section 352 analyzes the print jobs acquired by the job acquisition section 350 and extracts setting information of necessary print setting items from the print settings included in the print jobs. The job storage controller 354 registers the print jobs acquired by the job acquisition section 350 in the job registration DB 30'. Moreover, the job storage controller 354 registers the setting information of the print setting items extracted from the print jobs in the job registration DB 30' so as to be correlated with the print jobs.

When a user performs an operation input of instructing to display a list of print jobs in the image forming apparatus 1, first, the instruction acquisition section 356 acquires an instruction requesting the print server 300 to output job information necessary for displaying the list of print jobs from the image forming apparatus 1. The job information is the same as that described in the first embodiment and is information at least including information for identifying print jobs and print setting information included in the print jobs. Specifically, the job information is the information of the respective items shown in a print job list shown in FIG. 4.

Moreover, after the list of print jobs is displayed, when print jobs are selected and an operation input for a print instruction is performed in the image forming apparatus 1, the instruction acquisition section 356 acquires an instruction requesting the actual data of the print jobs selected as printing targets.

The transmission information acquisition section 358 acquires necessary information based on the instruction from the image forming apparatus 1 acquired by the instruction acquisition section 356. Specifically, when a request for job information necessary for displaying a list of print jobs is received, the transmission information acquisition section 358 accesses the job registration DB 30' to acquire the job information necessary for displaying the list of print jobs. Moreover, when a print instruction is received from the image forming apparatus 1, the transmission information acquisition section 358 acquires the actual data of the print jobs.

The information transmission section 360 transmits the information acquired by the transmission information acquisition section 358 to the image forming apparatus 1 through the network 130. Specifically, the job information including the setting information necessary for displaying the list of print jobs and the actual data of the print jobs in which the print instruction is received are transmitted to the image forming apparatus 1.

Hereinabove, the functions of the image forming apparatus 1 and the print server 300 according to the present embodiment have been described.

When a list of print jobs of a user who has logged in the image forming apparatus 1 is displayed on the display section 14a, the information acquisition section 210 of the image forming apparatus 1 may send a request for only the print jobs output by the logged-in user. Moreover, the transmission information acquisition section 358 having received this request may acquire job information of the print jobs output by the logged-in user from among the print jobs registered in the job registration DB 30', based on information of the logged-in user and the information transmission section 360 may transmit the job information.

Figure 10:
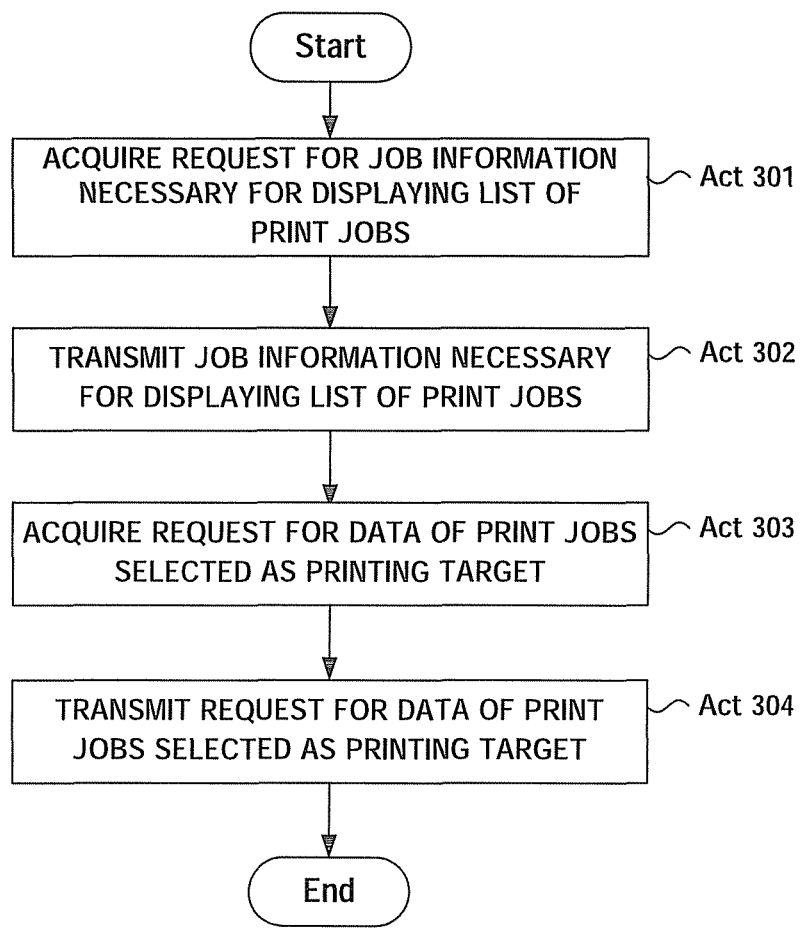
FIG. 10 is a flowchart illustrating the flow of processes on the print server.

Next, the flow of a process in which the print server 300 of the present embodiment receives a request for job information necessary for displaying a list of print jobs and transmits the job information, and a process in which when an operation input for a print instruction is performed on the image forming apparatus 1 side, and a request for print jobs to be printed is received from the image forming apparatus 1, the print server 300 transmits the print jobs will be described. FIG. 10 is a flowchart illustrating the flow of the process in the print server 300. In the following flowchart, a case where a list of print jobs output by a user who has logged in the image forming apparatus 1 is displayed will be described.

First, the instruction acquisition section 356 of the print server 300 acquires a request for job information necessary for displaying a list of print jobs from the image forming apparatus 1 through the network 130 (Act 301).

Subsequently, the transmission information acquisition section 358 accesses the job registration DB 30' to acquire the job information necessary for displaying the list of print jobs output by the logged-in user, and the information transmission section 360 transmits the acquired information to the image forming apparatus 1 (Act 302).

Subsequently, the instruction acquisition section 356 acquires a request for actual data of print jobs which are selected from the list of print jobs displayed in the image forming apparatus 1 based on the job information and in which a print instruction is received, from the image forming apparatus 1 (Act 303). Specifically, when a list screen 40 as shown in FIG. 4 is displayed on the display section 14a of the image forming apparatus 1, and the user selects print jobs to be printed from the list and issues a print instruction, the information acquisition section 210 outputs a request for data of the selected print jobs to the print server 300. Then, the instruction acquisition section 356 acquires the request.

Subsequently, the transmission information acquisition section 358 acquires corresponding print job data from the job registration DB 30' based on the request acquired by the instruction acquisition section 356, and the information transmission section 360 transmits the acquired print job data to the image forming apparatus 1 (Act 304).

Hereinabove, the flow of the process in the print server 300 of the present embodiment has been described.

The flow of a process in which the print server 300 acquires print jobs from the client terminal 100 and registers the acquired print jobs in the job registration DB 30' is the same as the flow of the process performed by the image forming apparatus 1 of the first embodiment, and description thereof will be omitted.

Figure 11:
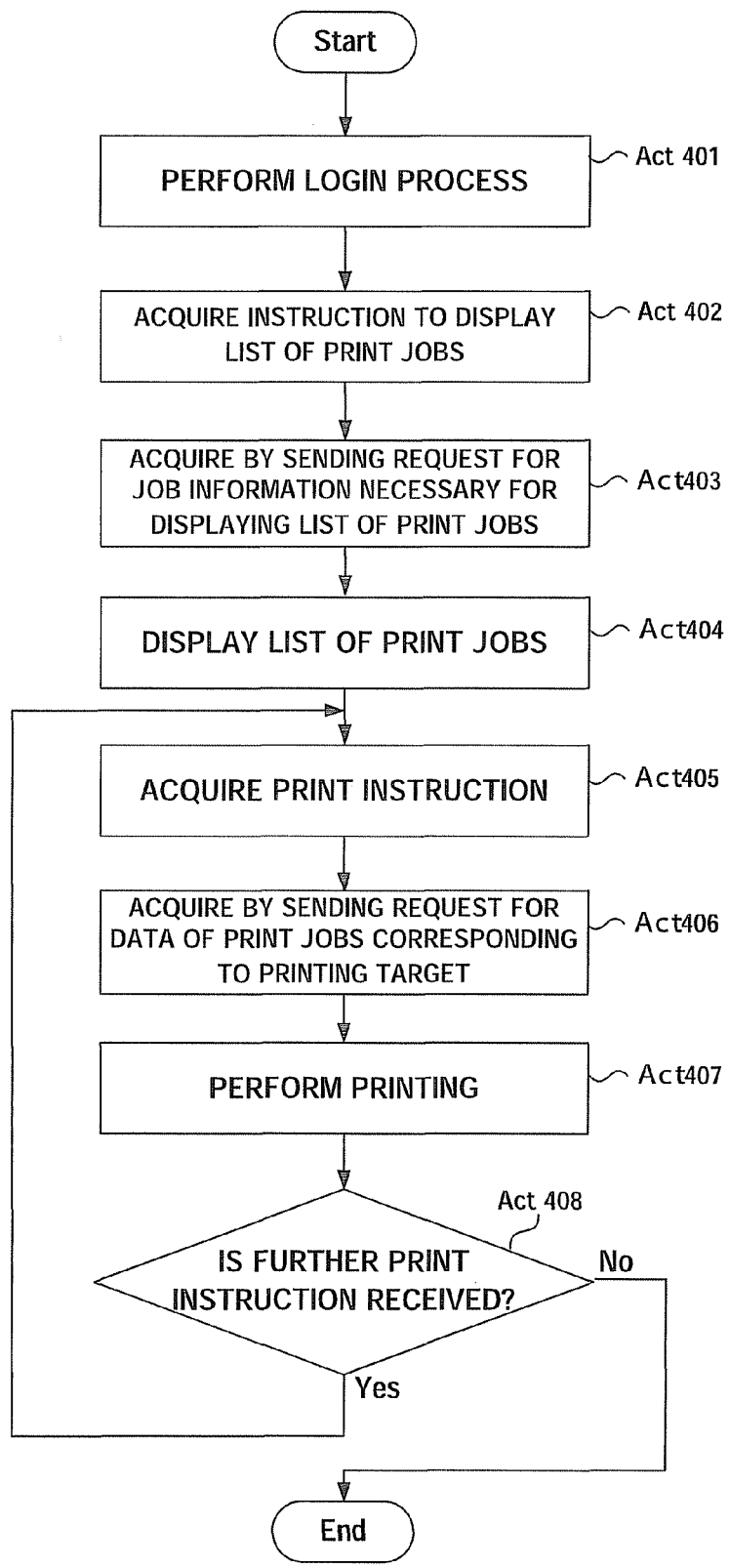
FIG. 11 is a flowchart illustrating the flow of a process of displaying a list of print jobs and a process of executing the print jobs.

Next, the flow of a process in which the image forming apparatus 1 displays a list of registered print jobs and a process in which the image forming apparatus 1 executes printing of print jobs selected as printing targets from the displayed list will be described. FIG. 11 is a flowchart illustrating the flow of the process of displaying a list of print jobs and the process of executing printing of print jobs.

First, a user performs a login process for starting the use of the image forming apparatus 1 (Act 401).

Subsequently, when the user operates the operation panel 14 to perform an operation input to display a list of print jobs, the operation input acquisition section 206 acquires an instruction to display the list of print jobs (Act 402).

Subsequently, the information acquisition section 210 acquires job information necessary for displaying the list of print jobs by sending a request thereof to the print server 300 (Act 403).

Subsequently, the display controller 212 displays the list of print jobs on the display section 14a based on the job information acquired by the information acquisition section 210 in Act 403 (Act 404). At that time, in the present embodiment, the display controller 212 displays the setting contents of color or monochrome display setting, both or one-side display setting, multiple display setting among setting information of print setting items correlated with each print job as the corresponding icons.

Subsequently, when the user selects print jobs as printing targets from among the print jobs displayed in the list and issues a print instruction, the operation input acquisition section 206 acquires the print instruction (Act 405).

Subsequently, the information acquisition section 210 sends a request for data of the print jobs in which the print instruction is received to the print server 300 and acquires the print job data from the print server 300 (Act 406).

Subsequently, the print controller 214 controls the printer section 10 so as to execute printing based on the acquired print job data (Act 407).

Subsequently, when the operation input acquisition section 206 acquires a further operation input of instructing to execute a process concerning a print job (Act 408: Yes), the flow returns to Act 405, and the process is repeated. On the other hand, when an operation input to terminate a process such as printing is acquired (Act 408: No), the process of displaying the print job list ends.

According to the present embodiment described above, in a system including the print server 300 and the image forming apparatus 1 in which print jobs are output from the client terminal 100 to the print server 300, it is possible to display the setting contents of predetermined print setting items as icons similarly to the first embodiment.

In the present embodiment, the image forming apparatus 1 acquires only the job information of corresponding print jobs when displaying the list of print jobs. However, the present invention is not limited to this. For example, all kinds of information constructing the list screen 40 may be stored in the print server 300. In this case, the image forming apparatus 1 may have only the function (e.g., a browser function) of displaying a screen, and when displaying a list of print jobs, a request for all kinds of information constructing the list screen 40 may be sent by the browser function so that the list screen 40 is displayed on the display section 14a.

Third Embodiment

Next, a third embodiment will be described. In the present embodiment, when displaying a list of print jobs, information on whether the image forming apparatus 1 which is to execute printing is able to perform printing in accordance with the setting contents of print setting items is displayed as icons with respect to the setting contents of print setting items. The same configuration as the embodiments described above will be denoted by the same reference numerals, and redundant description thereof will be omitted. In the present embodiment, a print processing system in which the print server 300 and the image forming apparatus 1 are connected by the network 130 will be described similarly to the second embodiment.

Figure 12:
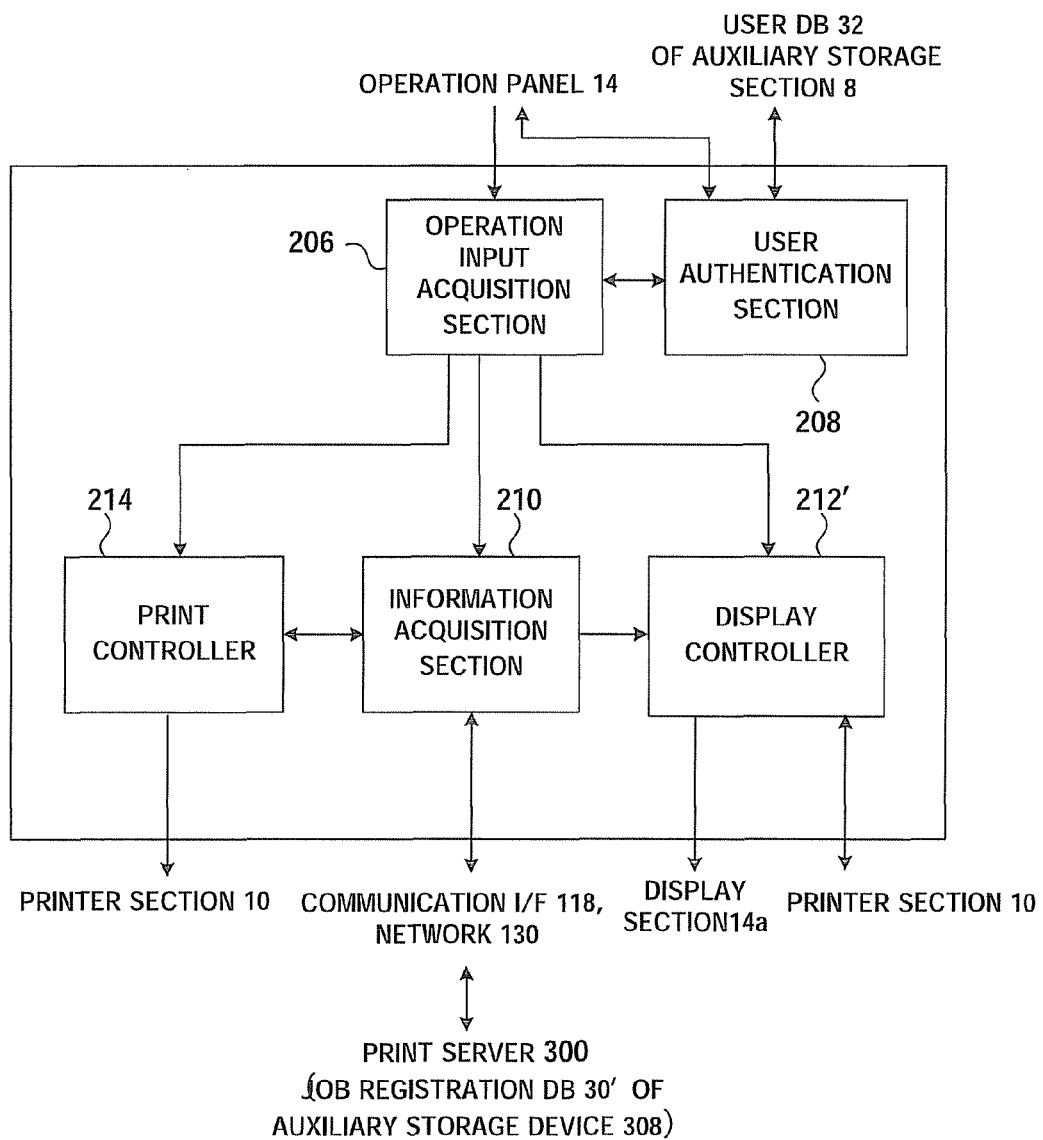
FIG. 12 is a functional block diagram illustrating the function of the image forming apparatus.

FIG. 12 is a functional block diagram illustrating the function of an image forming apparatus 1 according to the present embodiment. The image forming apparatus 1 of the present embodiment includes an operation input acquisition section 206, a user authentication section 208, an information acquisition section 210, a display controller 212', and a print controller 214.

The display controller 212' of the present embodiment displays a list of print jobs based on job information which the information acquisition section 210 acquired from a print server 300 and visually displays information on whether the image forming apparatus 1 is able to execute printing in accordance with the setting contents when displaying the setting contents of print setting items as icons. That is, when a setting in which it is unable to execute printing is included, a representation of an icon of that setting is changed to be different from a normal representation of the icon when print is possible.

Figure 13:
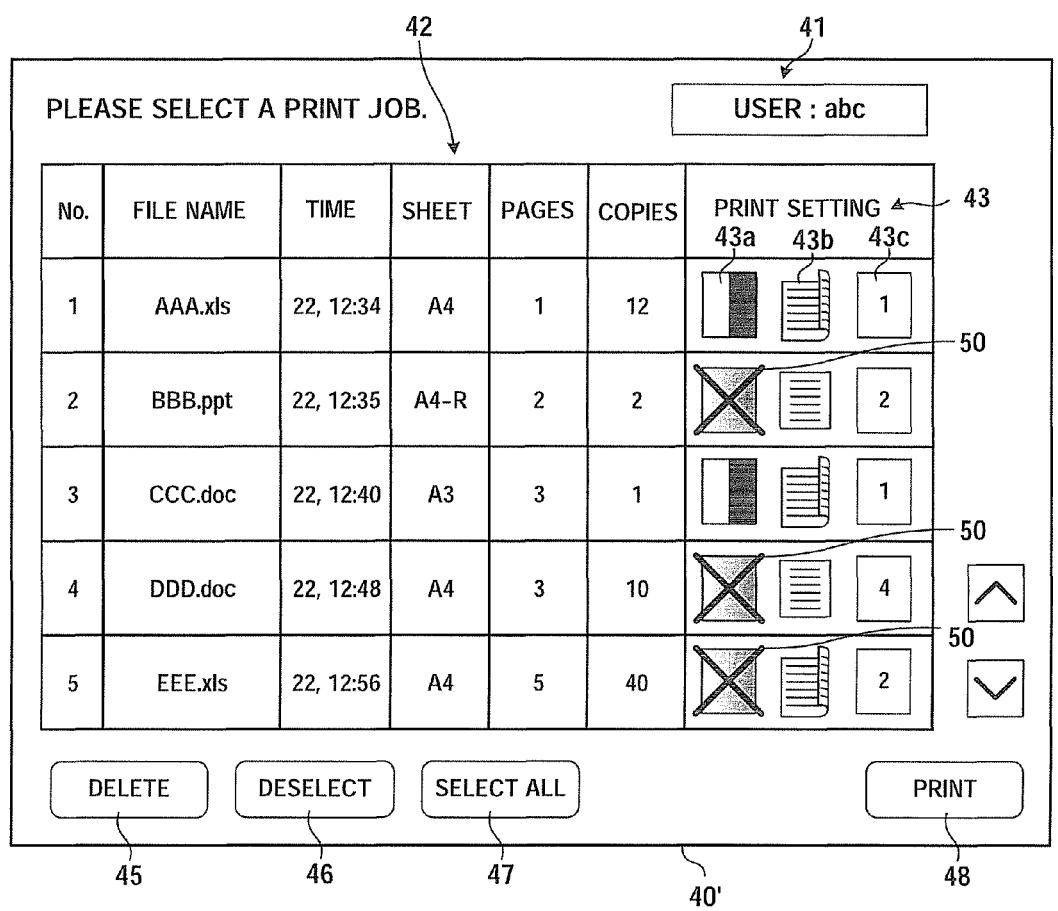
FIG. 13 is a diagram showing a print job list screen displayed by a display controller of the embodiment.

Here, a specific example of a list screen according to the present embodiment will be described based on FIG. 13. FIG. 13 shows a list screen 40' which is displayed by the display controller 212' of the present embodiment. As shown in FIG. 13, in a print setting item (43a) of color or monochrome setting, when the image forming apparatus 1 is unable to perform color printing, an X mark 50 is displayed on the icon. In FIG. 13, the X mark 50 is displayed on the icons of print jobs Nos. 2, 4, and 5 which have a color print setting. In this way, by visually displaying setting items which cannot be executed, it is possible to immediately grasp the setting contents which cannot be used in the image forming apparatus 1. Therefore, for example, it is easy to delete print jobs having color print setting which cannot be executed by the image forming apparatus 1 and output new print jobs having monochrome print setting.

There may be a number of reasons why the image forming apparatus 1 cannot execute printing. For example, as for the color or monochrome print setting, a case in which the image forming apparatus does not support color printing and a case in which a toner for color printing is used up may be considered. Therefore, the display controller 212' may visually display the setting contents which cannot be executed so that the setting contents are displayed differently between a case in which the image forming apparatus does not support the setting contents and a case in which printing can be performed if expendables are replaced and replenished, for example, by replacing a toner or supplying sheet. Specifically, the display controller 212' may display the X mark 50 on the icon when the function of the image forming apparatus 1 does not support the setting content or may display the corresponding icon in an blinking manner when the expendables are short so that the two cases become distinctive.

In this way, by changing the representation of the icon in accordance with the reason of inability to print, the user can take optimum measures when a print job that the user wants to print includes a setting content which cannot be executed.

Figure 14:
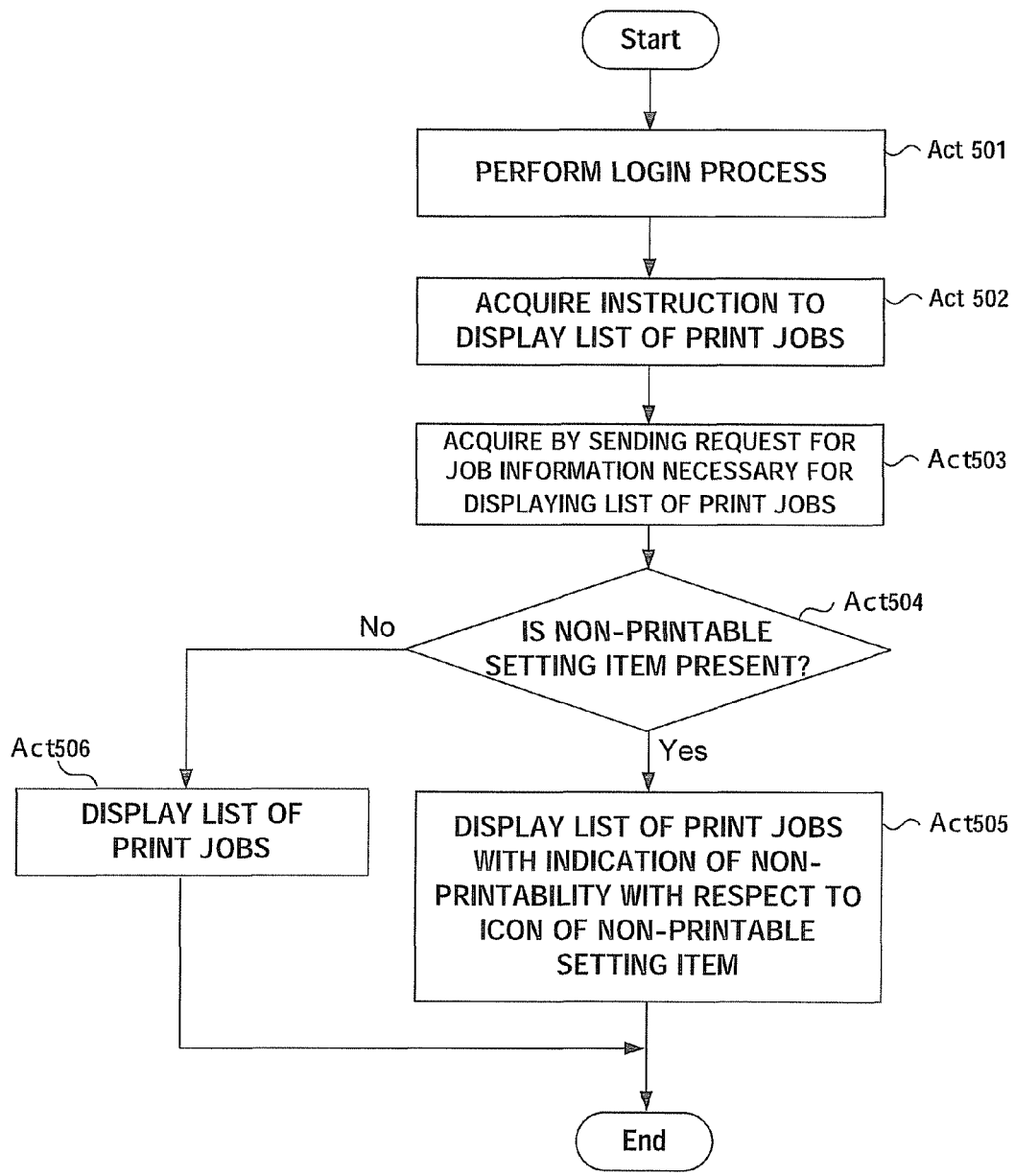
FIG. 14 is a flowchart illustrating the flow of a process of displaying a list of print jobs by the image forming apparatus.

Next, the flow of a process of displaying a list of print jobs by the image forming apparatus 1 of the present embodiment will be described. FIG. 14 is a flowchart illustrating the flow of a process of displaying a list of print jobs by the image forming apparatus 1. The flowchart of FIG. 14 shows the flow up to the process of displaying the X mark 50 on an icon of a setting content which cannot be executed. The flow of the process of selecting print jobs from the displayed list of print jobs and executing printing of selected print jobs is the same as that of the first and second embodiments, and redundant description thereof will be omitted.

First, when a user performs a login process (Act 501), and an instruction to display a list of print jobs is acquired in accordance with an operation input of the user (Act 502), the information acquisition section 210 sends a request for job information of the print jobs to be displayed in the list to the print server 300 to acquire the corresponding job information from the print server 300 (Act 503).

Subsequently, the display controller 212' compares the setting contents of print setting items of the acquired print jobs with the function of the printer section 10 and a state of expendables such as a toner or a sheet to determine whether there is a non-printable setting item (Act 504).

When there is a non-printable setting item (Act 504: Yes), the display controller 212' displays the list of print jobs with an indication of non-printability with respect to the icons of non-printable setting items (Act 505). Specifically, the X mark 50 or a blinking icon is displayed.

On the other hand, when there is no non-printable setting item (Act 504: No), the display controller 212' displays the list of print jobs as usual.

The image forming apparatus 1 may include a dedicated determination section that determines whether print jobs displayed in the list have a non-printable setting item.

The process of determining whether or not a non-printable setting item is included may be performed by the print server 300 without being limited to a case in which it is performed by the image forming apparatus 1. In this case, a result of the determination by the print server 300 may be transmitted to the image forming apparatus 1, and the display controller 212' of the image forming apparatus 1 may display a representation indicating the inability to execute a certain setting content based on the acquired determination result.

Moreover, the representation indicating the non-printable setting content is not limited to the X mark and a blinking icon, and other representation methods may be used as long as such non-printability can be recognized. For example, a gray-out representation that displays colors with a light shade may be used.

Modification 1 of Third Embodiment

Next, a modification of the third embodiment will be described.

The display controller 212' of the image forming apparatus 1 of the present embodiment displays an indication of non-printability (e.g., the X mark 50) when a print job includes a print setting content in which the image forming apparatus 1 is unable to execute printing at the time of displaying a list of print jobs. Moreover, when an operation input requesting to display other image forming apparatuses capable of executing printing without changing the setting content is received, the display controller 212' can acquire and display information of the other image forming apparatuses capable of executing printing using the function of the print server 300.

Figure 15:
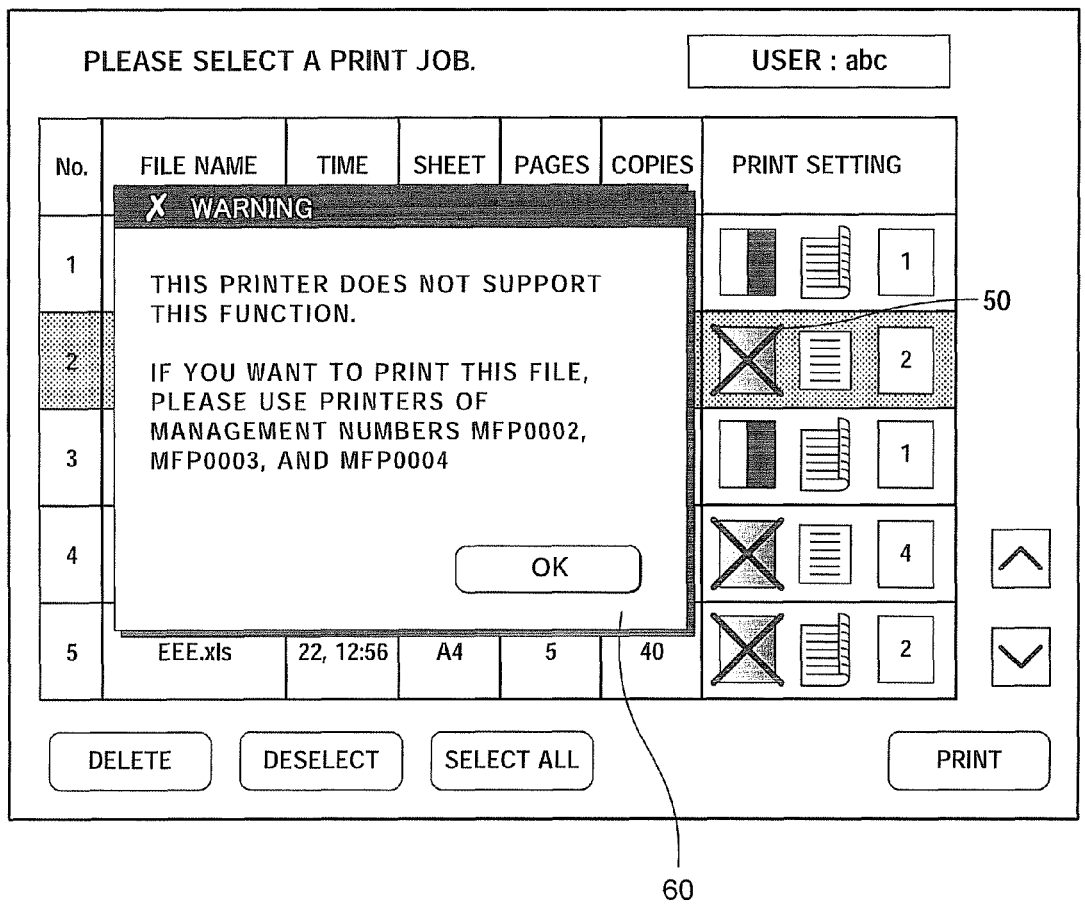
FIG. 15 is a diagram showing an example of a screen in which a guidance window is displayed on a print job list screen.

FIG. 15 shows an example of a screen in which the display controller 212' displays a guidance window 60 on the list screen 40. The guidance window 60 informs users of the fact that a print job selected by the user on the image forming apparatus 1 cannot be executed by the image forming apparatus 1 and that the selected print job can be executed by which image forming apparatus. FIG. 15 shows a state where the print job No. 2 is selected for which the X mark 50 is displayed since the print job has a color print setting in which the image forming apparatus 1 is unable to execute printing, whereby the guidance window 60 is displayed.

Next, the flow of the process performed by the image forming apparatus 1 of the present embodiment will be described. FIG. 16 is a flowchart illustrating the flow of a process of displaying the guidance window 60 guiding user to other image forming apparatuses capable of executing printing when there is a print setting item in which the image forming apparatus 1 is unable to execute printing. In the flowchart of FIG. 16, the flow of the process from the state in which the list screen 40 of the print jobs is already displayed will be described.

First, the operation input acquisition section 206 acquires an instruction to display other image forming apparatuses capable of printing selected print jobs (Act 601). In the present embodiment, the user outputs the instruction to display other image forming apparatuses capable of executing the selected print job by performing the operation input to select a print job for which an indication of non-printability is displayed.

Subsequently, the information acquisition section 210 acquires information for identifying the other image forming apparatuses capable of executing printing with the setting content of the selected print job by sending a request to the print server 300 (Act 602). Specifically, for example, as for the print job No. 2, an instruction to search for other image forming apparatuses capable of executing printing with the setting contents of color printing, one-side printing, and 2-in-1 and transmit information thereof is transmitted to the print server 300. In response to this instruction, the print server 300 collects the functions of image forming apparatuses connected to the print server 300 and operation states such as a remaining amount of a toner or a sheet and searches for alternative image forming apparatuses capable of executing the print job selected in the image forming apparatus 1. When there is an image forming apparatus capable of executing the print job, information for identifying the image forming apparatus is transmitted to the image forming apparatus 1. Here, the functions of image forming apparatuses connected to the print server 300 and the operation states thereof may be collected by the transmission information acquisition section 358 of the print server 300, and the print server 300 may further include a dedicated information collecting section.

The information for identifying the image forming apparatuses may be the management numbers of the image forming apparatuses, for example. However, a representation method thereof is not limited to the management numbers, but any representation method can be used as long as users can identify an image forming apparatus by looking at the representation thereof. For example, a location of an image forming apparatus may be displayed on a map.

Subsequently, the display controller 212' displays information representing the other image forming apparatuses capable of executing the print job based on the information transmitted from the print server 300 (Act 603). A display example thereof is as shown in FIG. 15.

As described above, by displaying the information for identifying the other image forming apparatuses capable of executing printing of selected print jobs, the users can be informed of the other image forming apparatuses capable of executing printing with the present settings without changing the print setting contents of the print jobs. Therefore, the user can move to the displayed printable image forming apparatus, display the list of print jobs again to select the print job that the user wants to print from the list, and execute printing without changing the setting contents.

In the present embodiment, when an operation input to display other image forming apparatuses capable of executing printing is received by the image forming apparatus 1, the image forming apparatus 1 sends a request for the information for identifying other image forming apparatuses capable of executing printing to the print server 300, and the print server 300 performs searching to transmit the information of the corresponding image forming apparatuses to the image forming apparatus 1. However, this invention is not limited to this. For example, when the information acquisition section 210 of the image forming apparatus 1 sends a request for job information in order to display a list of print jobs, the print server 300 may compare the setting contents of the respective setting items of the print jobs of which the job information is transmitted with the states of other image forming apparatuses other than the image forming apparatus 1 connected to the print server 300. Then, the print server 300 may transmit information of image forming apparatuses other than the image forming apparatus 1, capable of executing the print jobs, of which the job information is transmitted, to the image forming apparatus 1 together with the job information. In this case, when the user issues an instruction to display the information of the other image forming apparatuses capable of executing a print job which cannot be executed in the image forming apparatus 1 by selecting the print job, the information of all of the corresponding image forming apparatuses can be displayed.

Modification 2 of Third Embodiment

As another modification, when a print job can be printed by neither the image forming apparatus 1 nor the other image forming apparatuses connected to the print server 300, the display controller 212' may display a message informing that the print job can be printed by any image forming apparatus if the setting content of the print job is changed in a certain way. For example, a message informing that if color print setting is changed to monochrome print setting, the print job can be printed by the image forming apparatus 1 or other image forming apparatuses connected to the print server 300 can be displayed.

With such a message, the users can easily grasp a way to change the print setting content of the print job that the user wants to print so that the print job can be printed by the image forming apparatus 1 or the other image forming apparatuses.

Modification 3 of Third Embodiment

As a further modification, when a print job can be printed by neither the image forming apparatus 1 nor the other image forming apparatuses connected to the print server 300, and a storage period of jobs in the job registration DB 30' is limited to a predetermined period from a registration, a job storage controller 354 of the print server 300 may change the storage period in the job registration DB 30', of the print job which cannot be printed.

Specifically, the job storage controller 354 may extend the storage period. By extending the storage period, in some case, a print job which was not printed due to a temporary shortage of expendables such as a toner or a sheet can be printed by replenishing the expendables. By extending the storage period of print jobs in the job registration DB 30' so that the print jobs are stored until the jobs can be printed, the client terminal 100 does not need to output the same print jobs again.

As described in detail above, according to the present invention, it is possible to provide an image forming apparatus capable of displaying a screen so that the contents of print jobs can be grasped immediately.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. An image forming apparatus comprising:
an information acquisition section that acquires job information at least including information for identifying target print jobs to be displayed in a list and setting information for designating settings of print processes included in the target print jobs in order to display a list of print jobs output from terminals connected to the image forming apparatus so as be able to perform data communication on a screen;
a display controller that displays a list of print jobs on the screen based on the job information acquired by the information acquisition section, in which the settings of the print processes designated by the setting information are displayed on a list screen as pictures representing content of the setting for each setting item,
wherein the list screen is on a portion of the screen, and the screen displays the list of print jobs and adjacent to each job is the list screen of pictures representing content of the setting for each setting item designating print processes included in each target print job displayed in the list of print jobs,
the display controller changes the display form of the pictures indicating the setting items that is unable to execute the print process since a function of the image forming apparatus does not support setting of the print process of the print job; and
a print controller that controls execution of print jobs selected by an operation input from among the print jobs displayed in the list.

2. The apparatus according to claim 1, further comprising:
a job acquisition section that acquires print jobs output from the terminals; and
a storage controller that stores the print jobs acquired by the job acquisition section in a storage region.

3. The apparatus according to claim 2, further comprising a setting information extraction section that extracts setting information for each setting item which is displayed on the list screen as the pictures from among the setting information included in the print jobs acquired by the job acquisition section,
wherein the storage controller stores the setting information extracted by the setting information extraction section so as to be correlated with the print jobs of which the setting information is extracted.

4. The apparatus according to claim 3,
wherein the information acquisition section acquires the information for identifying the target print jobs to be displayed in the list and the setting information that is extracted by the setting information extraction section and stored so as to be correlated with the print jobs as the job information.

5. A print processing method comprising:
acquiring job information at least including information for identifying target print jobs to be displayed in a list and setting information for designating settings of print processes included in the target print jobs in order to display a list of print jobs output from terminals connected to the image forming apparatus so as be able to perform data communication on a screen, displaying a list of print jobs on the screen based on the acquired job information and displaying the settings of the print processes designated by the setting information on a list screen as pictures representing content of the setting for each setting item, wherein the list screen is on a portion of the screen, displaying, on the screen, the list of print jobs and adjacent to each job is the list screen of pictures representing content of the setting for each setting item designating print processes included in each target print job displayed in the list of print jobs, changing the display form of the pictures indicating the setting items that is unable to execute the print process since a function of the image forming apparatus does not support setting of the print process of the print job, and controlling execution of print jobs selected by an operation input from among the print jobs displayed in the list of print jobs.

6. The method according to claim 5, further comprising:
acquiring print jobs output from the terminals; and
storing the acquired print jobs in a storage region.

7. The method according to claim 6, further comprising:
extracting setting information for each setting item which is displayed on the list screen as the pictures from among the setting information included in the acquired print jobs; and
storing the extracted setting information so as to be correlated with the print jobs of which the setting information is extracted.

8. The method according to claim 7,
wherein the information for identifying the target print jobs to be displayed in the list of print jobs and the extracted setting information stored so as to be correlated with the print jobs are acquired as the job information.

* * * * *